US011995197B2

(12) United States Patent
Huo et al.

(10) Patent No.: US 11,995,197 B2
(45) Date of Patent: May 28, 2024

(54) SENSITIVE DATA ENCRYPTION

(71) Applicant: INTERNATIONAL BUSINESS MACHINES CORPORATION, Armonk, NY (US)

(72) Inventors: Qi Feng Huo, Beijing (CN); Yan Song Liu, Beijing (CN); Da Li Liu, Beijing (CN); Lei Li, Beijing (CN); Yuan Yuan Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 17/443,468

(22) Filed: Jul. 27, 2021

(65) Prior Publication Data
US 2023/0032363 A1 Feb. 2, 2023

(51) Int. Cl.
*G06F 21/60* (2013.01)
*G06F 21/62* (2013.01)
*H04L 9/08* (2006.01)

(52) U.S. Cl.
CPC ........ *G06F 21/602* (2013.01); *G06F 21/6245* (2013.01); *H04L 9/0822* (2013.01); *H04L 9/0897* (2013.01); *G06F 2221/2149* (2013.01)

(58) Field of Classification Search
CPC ............... G06F 21/602; G06F 21/6245; G06F 2221/2149; G06F 21/606; H04L 9/0822; H04L 9/0897; H04L 9/14
See application file for complete search history.

(56) References Cited

U.S. PATENT DOCUMENTS 9,525,668 B2 * 12/2016 Bhargav-Spantzel ...................... H04L 63/0428
10,516,533 B2 * 12/2019 Mannan ................ H04L 9/3226
(Continued)

FOREIGN PATENT DOCUMENTS

CN 111881474 A 11/2020
CN 112202713 A 1/2021
(Continued)

OTHER PUBLICATIONS

Alibaba Cloud Documentation Center, "TEE-based confidential computing", https://www.alibabacloud.com/help/doc-detail/164536.htm?spm=a2c65.11461447.0.0.19a921bcnldjrp, Dec. 11, 2020, pp. 1-9.
(Continued)

*Primary Examiner* — Abiy Getachew
(74) *Attorney, Agent, or Firm* — Tihon Poltavets

(57) ABSTRACT

In a method for encryption of sensitive data, an encrypted user private key is received in a Trusted Execution Environment (TEE) in a worker node in a container management system, the encrypted user private key being an encrypted version of a user private key for decrypting a message from a user in the container management system. The user private key is obtained in the TEE, and the encrypted user private key being decrypted into the user private key with a provider private key that is received from an encryption manager for managing the container management system. With these embodiments, the user private key may be transmitted to the worker node safely, such that the worker node may use the user private key to decrypt messages from the user. Therefore, the security level of the container management system may be increased.

17 Claims, 7 Drawing Sheets

(56) References Cited

U.S. PATENT DOCUMENTS

| | | | |
|---|---|---|---|
| 2012/0137117 A1 | 5/2012 | Bosch | |
| 2013/0013928 A1* | 1/2013 | Thom | G06F 21/30 |
| | | | 713/182 |
| 2016/0234176 A1* | 8/2016 | Chu | H04L 63/04 |
| 2019/0155728 A1 | 5/2019 | Ferguson | |
| 2021/0049284 A1* | 2/2021 | Tyagi | G06F 21/629 |
| 2021/0247994 A1* | 8/2021 | Patil | G06F 9/455 |
| 2021/0266148 A1* | 8/2021 | Tsirkin | H04L 9/0894 |
| 2021/0365547 A1* | 11/2021 | Atkinson | H04L 9/0894 |

FOREIGN PATENT DOCUMENTS

| | | |
|---|---|---|
| CN | 112926046 A | 6/2021 |
| WO | 2021067091 A1 | 4/2021 |

OTHER PUBLICATIONS

Alibaba Cloud Documentation Center, "Use KMS to encrypt Kubernetes secrets at rest", https://partners-intl.aliyun.com/help/doc-detail/187472.htm, Nov. 30, 2020, pp. 1-3.

Disclosed Anonymously, "Protecting Secrets in Docker Environments", https://priorart.ip.com/IPCOM/000262988, IP.com No. IPCOM000262988D, Jul. 29, 2020, pp. 1-6.

IBM, "Creating an encrypted custom image", https://cloud.ibm.com/docs/vpc?topic=vpc-create-encrypted-custom-image, Apr. 28, 2021, pp. 1-10.

IBM, "Protecting sensitive information in your cluster", https://cloud.ibm.com/docs/containers?topic=containers-encryption&locale=zh-CN, Sep. 30, 2020, pp. 1-14.

Mell et al., "The NIST Definition of Cloud Computing", National Institute of Standards and Technology, Special Publication 800-145, Sep. 2011, pp. 1-7.

Narendra, "Kubernetes Secrets Management with HashiCorp Vault and Rafay", https://rafay.co/the-kubernetes-current/kubernetes-secrets-management-with-hashicorp-vault-and-rafay/, Jan. 22, 2021, pp. 1-8.

Oracle, "Encrypting Kubernetes Secrets at Rest in Etcd", https://docs.cloud.oracle.com/en-us/iaas/Content/ContEng/Tasks/contengencryptingdata.htm, 2020, pp. 1-5.

Osnat, "Protecting Kubernetes Secrets—A Practical Guide", https://blog.aquasec.com/managing-kubernetes-secrets, Aqua Blog, Jan. 15, 2019, pp. 1-5.

Protalinski, "Microsoft announces Confidential Computing for Kubernetes, IPV4/IPv6 dual-stack, and KEDA 1.0", https://venturebeat.com/2019/11/19/microsoft-announces-confidential-computing-for-kubernetes-ipv4-ipv6-dual-stack-and-keda-1-0/, Nov. 19, 2019, pp. 1-3.

Rashid, "Mounting LUKS encrypted Disks using Google Secrets Manager", https://salmaan-rashid.medium.com/mounting-luks-encrypted-disks-using-google-secrets-manager-3eb173920a75, Apr. 2, 2020, pp. 1-7.

Vmware Tanzu Docs, "Encrypt Secrets in an etcd Database", https://docs.pivotal.io/pks/1-7/k8s-profiles-encrypt-etcd.html, Dec. 9, 2020, pp. 1-8.

Yeluri et al., "TEE-based KMS Plugin for encryption of Kubernetes Secrets", https://kccncna19.sched.com/event/UaZ2, Intel Corporation, North America 2019, KubeCon, CloudNativeCon, pp. 1-19.

International Search Report and The Written Opinion of the International Searching Authority, or the Declaration, Applicant's Reference PF2201479PCT, International Application No. PCT/CN2022/106184, International filing date Jul. 18, 2022, completion date: Sep. 28, 2022, Date of mailing of the International search report: Oct. 10, 2022, pp. 1-10.

* cited by examiner

SENSITIVE DATA ENCRYPTION

BACKGROUND

The present invention relates to data encryption, and more specifically, to methods, systems and computer program products for encrypting and decrypting sensitive data in a container management environment.

Nowadays, container techniques are widely used in the software industry. Various types of container management systems are provided for deploying container(s) in one or more worker nodes. Sensitive data such as passwords and so on are provided in the container management system for configuring respective containers and/or for another purpose. At this point, how to protect the sensitive data and increase the security level of the container management system becomes a primary focus.

SUMMARY

According to embodiments of the present invention, there is provided a computer-implemented method that may be implemented by one or more processors. In the method, one or more processors receive an encrypted user private key in a Trusted Execution Environment (TEE) in a worker node in a container management system, the encrypted user private key being an encrypted version of a user private key for decrypting a message from a user in the container management system. One or more processors obtain the user private key in the TEE, here the encrypted user private key is decrypted into the user private key with a provider private key that is received from an encryption manager for managing the container management system.

According to embodiments of the present invention, there is provided a computer-implemented method that may be implemented by one or more processors. In the method, one or more processors encrypt a user private key with a provider public key that is received from an encryption manager for managing a container management system, the user private key being for decrypting a message from a user in a container management system. One or more processors transmit the encrypted user private key to a worker node in the container management system, such that the worker node obtains in a Trusted Execution System (TEE) in the worker node the user private key, here the encrypted user private key is decrypted into the user private key with a provider private key that is received from the encryption manager.

According to another embodiment of the present invention, there is provided a computer-implemented system. The computer-implemented system comprises a computer processor coupled to a computer-readable memory unit, where the memory unit comprises instructions that when executed by the computer processor implements the above method.

According to another embodiment of the present invention, there is provided a computer program product. The computer program product comprises a computer readable storage medium having program instructions embodied therewith. The program instructions are executable by an electronic device to cause the electronic device to perform actions of the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
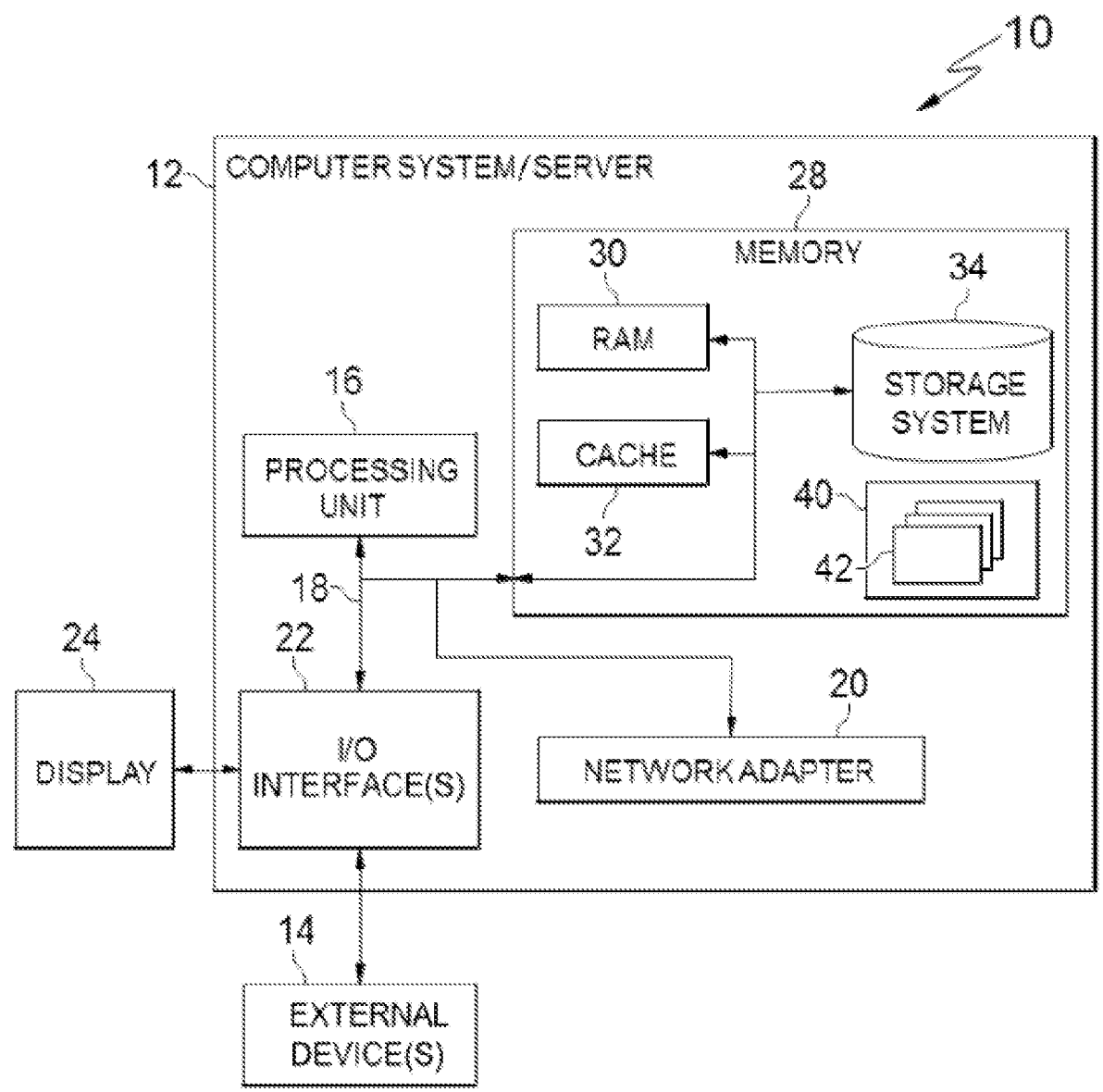
FIG. 1 depicts a cloud computing node according to embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, database system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival database systems, etc.

Figure 2:
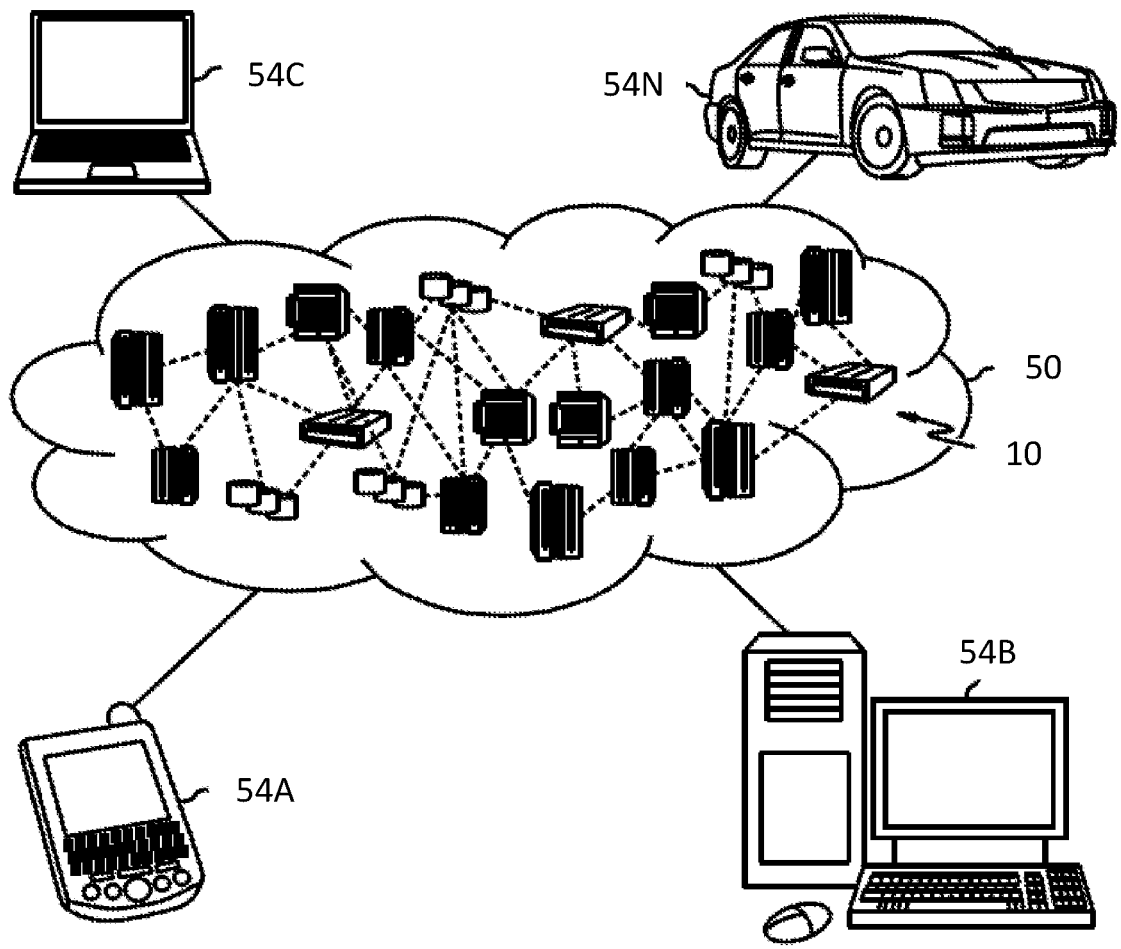
FIG. 2 depicts a cloud computing environment according to embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
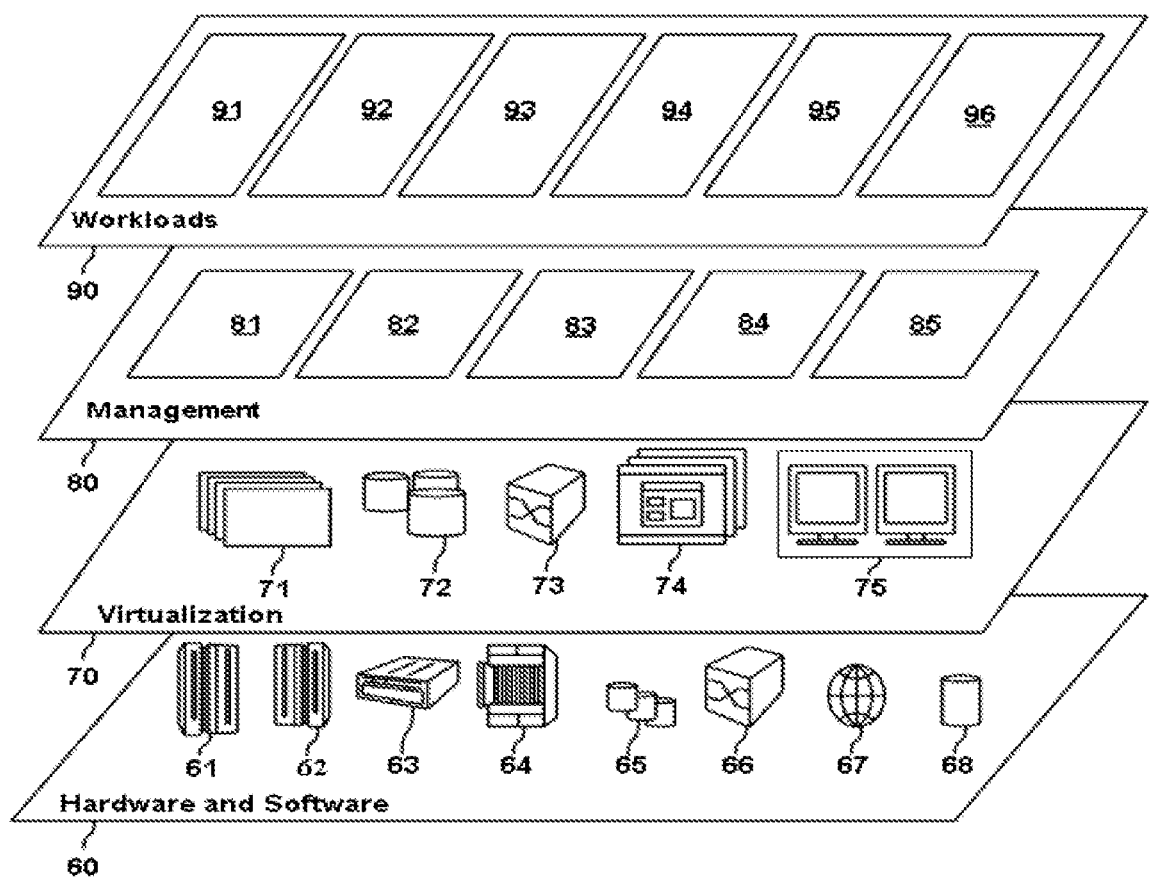
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption processing 96.

Figure 4:
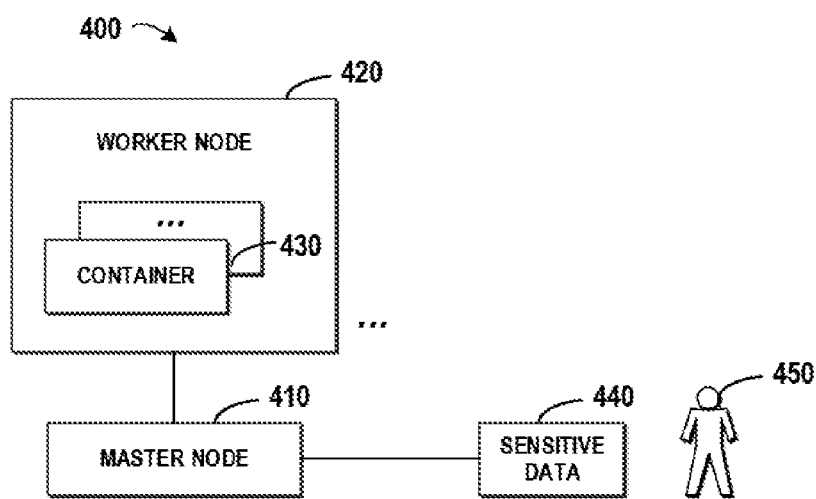
FIG. 4 depicts an example diagram of a container management system in which embodiments of the present invention may be implemented.

It should be noted that the encryption processing 96 according to embodiments of the present invention could be implemented by computer system/server 12 of FIG. 1. Reference will be made to FIG. 4 for a brief description of the container management system. FIG. 4 depicts an example diagram of a container management system 400 in which embodiments of the present invention may be implemented. Here, the container management system 400 may include a master node 410 and a worker node 420 on which one or more container 430 are deployed. The master node 410 may be used for managing the worker node 420. For example, if the workload of the worker node 420 increases to a predefined threshold, another worker node may be launched by the master node 410 for sharing the workload of the worker node 420. If the workload decreases to a predefined threshold, the master node 410 may terminate one of the launched worker nodes.

Here, the container management system 400 may include the Kubernetes system, where sensitive data 440 such as secrets of a user 450 may be provided for storing confidential information. Here, the user 450 may include a customer of the container management system 400, alternatively and/or in addition to, the user 450 may include an administrator of the container management system 400. The secret may be an environment parameter and/or a file that contains confidential data storing a password, a token, or a key for managing a container. In the existing Kubernetes system, the secret is encoded in a base format, and during storing and transmitting the secret, the secret is easily to be decoded and thus becomes visible in the container management system 400. For example, the secret is in a plaintext format in the memory of the master node, and thus anyone who can access the memory may read the secret from the memory. Therefore, it is desired to encrypt the sensitive data 440 and increase the security level for the secret.

Figure 5:
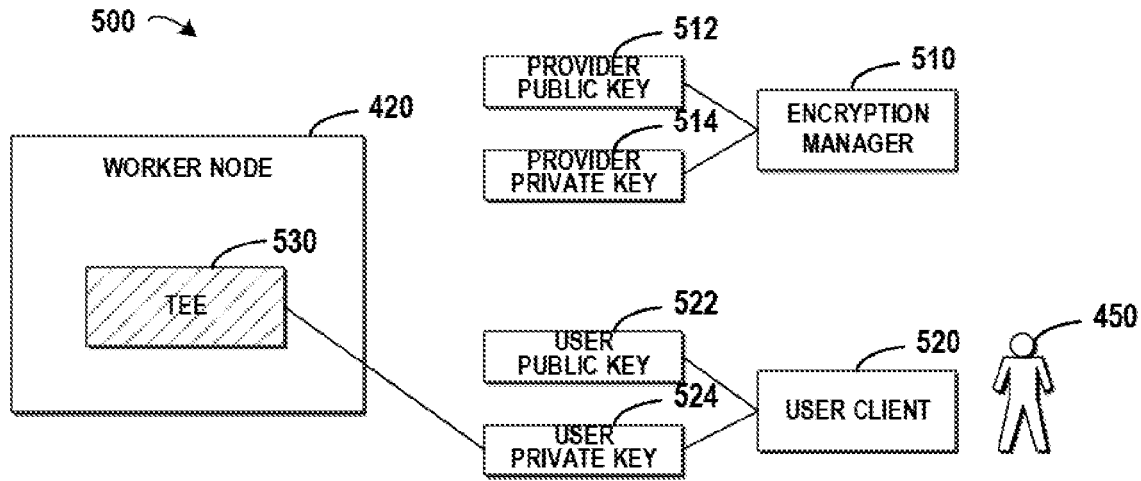
FIG. 5 depicts an example architecture for managing sensitive data by a plurality of keys according to embodiments of the present invention.

In view of the above drawbacks, embodiments of the present invention provide an effective solution for managing the sensitive data. In some embodiments of the present invention, a pair of provider keys (including a provider public key and a provider private key) and a pair of user keys (including a user public key and a user private key) are provided for encrypting the sensitive data. Referring to FIG. 5 for a brief of the present invention, where FIG. 5 depicts an example architecture 500 for managing sensitive data by a plurality of keys according to embodiments of the present invention. In FIG. 5, a provider public key 512 and a provider private key 514 may be provided by an encryption manager 510. Further, a user public key 522 and a user private key 524 may be defined by the user 450. For example, the user 450 may define the user public key 522 and the user private key 524 via a user client 520.

As shown in FIG. 5, the worker node 420 may include a TEE, and the user private key 524 may be transmitted to the TEE 530 in a reliable way by using the private key 514, so as to facilitate the sensitive data encryption. Further, the sensitive data may be encrypted with the user public key 522 first, and thus the sensitive data is stored and transmitted in an encrypted version outside the TEE 530. Therefore, no one can decrypt the encrypted sensitive data outside the TEE 530 due to the user private key 524 only existing in the TEE 530. Accordingly, the encrypted sensitive data is safe outside the TEE 530. Here, the encrypted sensitive data may be decrypted into the sensitive data only in the TEE 530. As the TEE 530 is a completely reliable environment with a high security level, the sensitive data is safe in the TEE 530.

Figure 6:
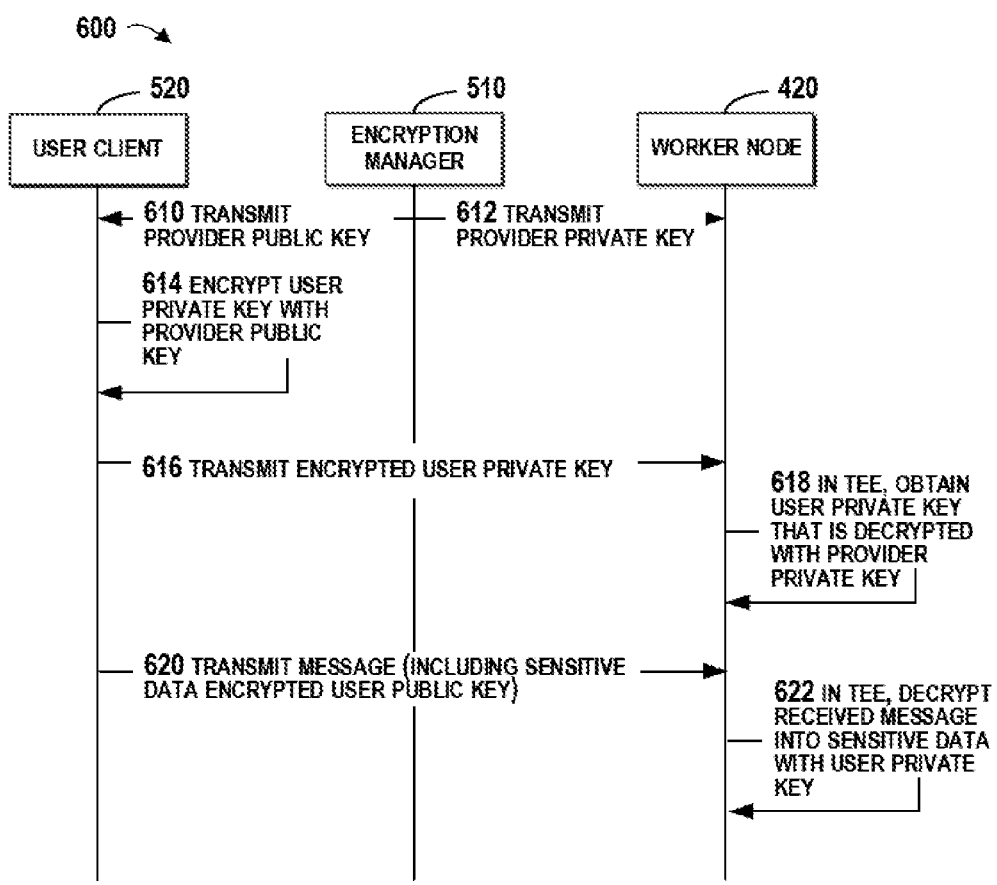
FIG. 6 depicts an example procedure for encrypting sensitive data according to embodiments of the present invention.

Referring to FIG. 6 for more details of the present invention, here FIG. 6 depicts an example procedure 600 for encrypting sensitive data according to embodiments of the present invention. In FIG. 6, the encryption manager 510 may transmit 610 the provider public key 512 to the user client 520. Here, the provider public key 512 is a public key for encrypting the user private key 524, and it may be transmitted to the user client 520 directly. Meanwhile, the encryption manager 510 may transmit 612 the provider private key to the worker node 420. Here, the provider private key 514 is a private key corresponding to the provider public key 512 (i.e., for decrypting data that is encrypted with the provider public key 512), it may be obtained from the encryption manager 510 and stored in a security way.

Figure 7:
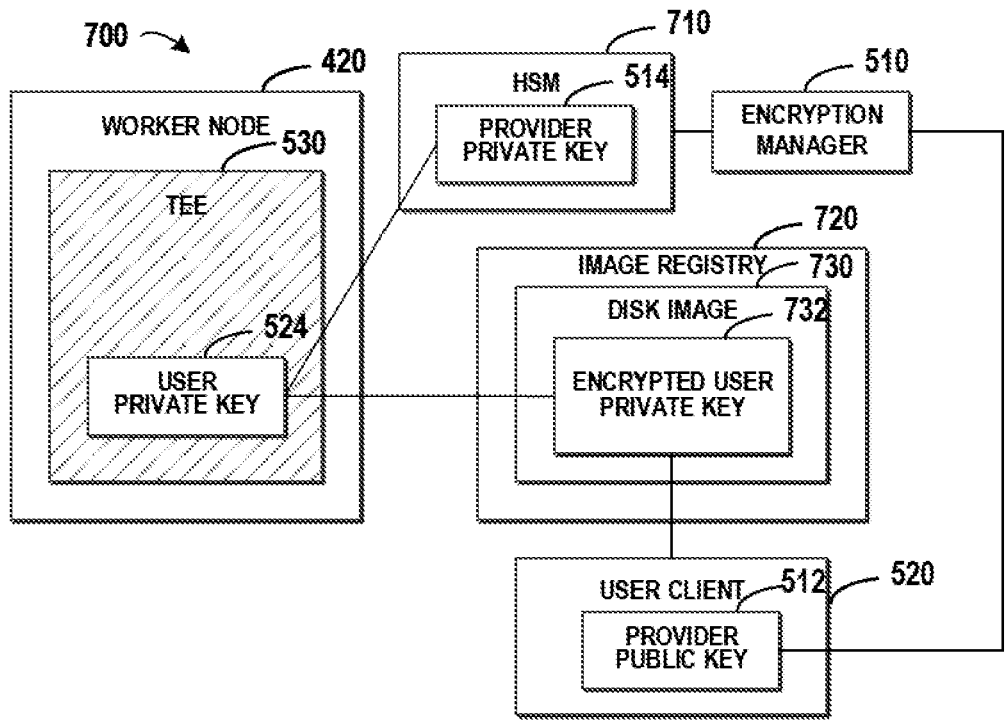
FIG. 7 depicts an example procedure for distributing multiple keys in a TEE according to embodiments of the present invention.

Referring to FIG. 7 for more details of a distribution of the multiple keys, here FIG. 7 depicts an example procedure 700 for distributing the user private key 524 to a TEE 530 according to embodiments of the present invention. As shown in FIG. 7, the provider private key 514 may be saved in a hardware security module (HSM) 710. Here, the HSM 710 refers to a physical computing device that safeguards and manages digital keys and performs encryption and decryption functions. The HSM 710 may provide a special "trusted" way for performing a variety of cryptographic operations such as key management, key exchange, and encryption etc. Therefore, the HSM 710 may provide an effective and secure way for storing the provider private key 514, and then a firmware associated with the worker node 420 may access the provider private key 514 and decrypt the encrypted user private key into the user private key 524.

Referring back to FIG. 6, the user client 520 may encrypt 614 the user private key 524 with the provider private key. The user private key 524 is generated at the user client 520, and the user private key 524 may be directly encrypted with the provider public key 512. Then, the user client 520 may transmit 616 the encrypted user private key to the worker node 420. Various methods may be used for transmitting the encrypted user private key. Referring to FIG. 7 for more details, the user client 520 may insert the encrypted user private key 732 into a disk image 730 of a container that is to be deployed in the worker node 420. Here, the disk image 730 may be first stored in an image registry 720 for distributing disk images to the worker node 420, and then the disk image 730 may be distributed to the worker node 420 according to a normal way. With these embodiments, it does not need to set up a channel for distributing the encrypted user private key 732, instead, the image registry 720 in the container management system 400 may be reused for transmitting the encrypted user private key 732 to the worker node 420.

Although the above paragraph describes a procedure for transmitting the encrypted user private key 732 via the image registry 720. Alternatively and/or in addition to, the encrypted user private key 732 may be distributed in another way as along as the encrypted user private key 732 reaches the worker node 420. As the encrypted user private key 732 is in an encrypted version during the transmitting, and the provider private key 514 only exists in the TEE 530, no one outside the TEE 530 can decrypt the encrypted user private key 732. Therefore, the encrypted user private key 732 is transmitted in a safe and effective way.

Figure 8:
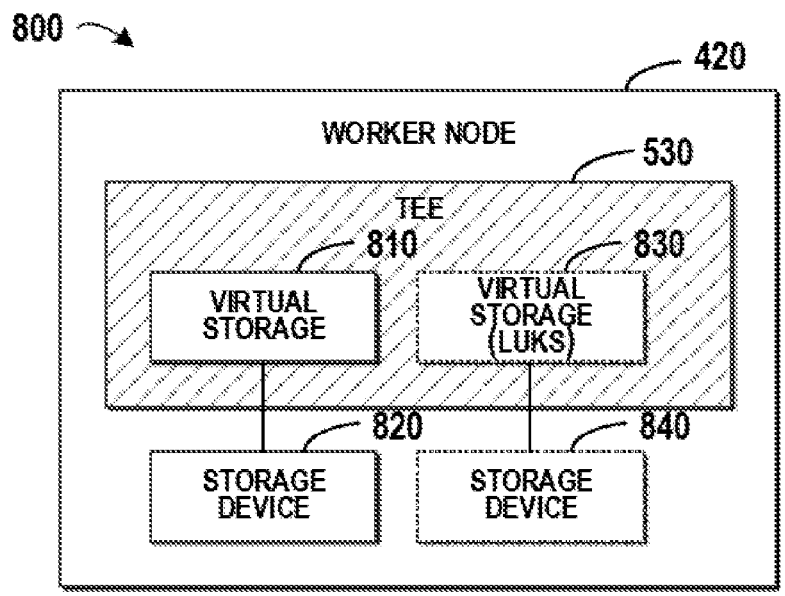
FIG. 8 depicts an example structure of a worker node according to embodiments of the present invention.

In some embodiments, the encrypted user private key 732 may be transmitted into the TEE 530 via a storage device that is outside the TEE 530. Referring to FIG. 8 for more details about the worker node 420. FIG. 8 depicts an example structure 800 of a worker node according to embodiments of the present invention. In FIG. 8, the worker node 420 may be divided into two portions: one portion is within the TEE 530 and operations in this portion are safe and cannot be accessed by any illegal attackers; and the other portion is outside the TEE 530. For example, a storage device 820 may be provided in this portion for communicating with other objects (such as the image registry 720 and the user client 520) in the container management system 400. Here, the disk image 730 may be first transmitted to the storage device 820 in the worker node 420, and then the disk image 730 may be loaded from the storage device 820 into the TEE 530. With these embodiments, the storage device 820 may work as an intermediate device between the TEE 530 and the untrusted environment outside the TEE 530, therefore the security level of the container management system 400 may be ensured.

In order to read the disk image from the storage device 820 into the TEE 530, a virtual storage 810 may be created in the TEE 530 and it may be mounted to the storage device 820. Therefore, the disk image including the encrypted user private key may be loaded into the virtual storage 810 in the TEE 530. In the TEE 530, the encrypted user private key may be extracted from the disk image by parsing the disk image. Then, the encrypted user private key may be decrypted into the user private key with the provider private key 514 in the HSM 710.

Referring back to FIG. 6, in the TEE 530, the worker node 420 may obtain 618 the user private key that is decrypted with the provider private key 512. A firmware associated with the worker node 420 may use the provider private key 514 in the HSM 710 to decrypt the encrypted user private key in to the user private key 524. Here, the firmware may be a firmware of the worker node 420, alternatively and/or in addition to, the firmware may be a firmware of a computing device on which the worker node 420 locates. In some embodiments, the firmware may obtain the user private key when the worker node 420 is created. In other words, when the worker node 420 is created, the user private key exists in the TEE 530 of the created worker node. Once the user private key is decrypted, it may be used for decrypting message(s) from the user 450. With these embodiments, the decrypted version of the user private key only exists in the TEE 530, and then the TEE 530 may protect the user private key from any illegal attack.

In order to provide further protections to the container management system 400, the Linux Unified Key Setup (LUKS) technique may be used in the worker node 420. At this point, a LUKS password may be sent to the worker node 420 together with the encrypted user private key 732 (for example, the disk image may include both of the encrypted user private key and the LUKS password). Here, the LUKS password may be used for accessing the data that is created based on the LUKS technique. Referring to FIG. 8, a virtual storage 830 which is based on LUKS may be created in the TEE 530. Then, the virtual storage 830 may be mounted to a storage device 840. At this point, the data in the storage device 840 may be further protected by the LUKS password, and the data may be accessed in the virtual storage 830 with the LUKS password.

Figure 9:
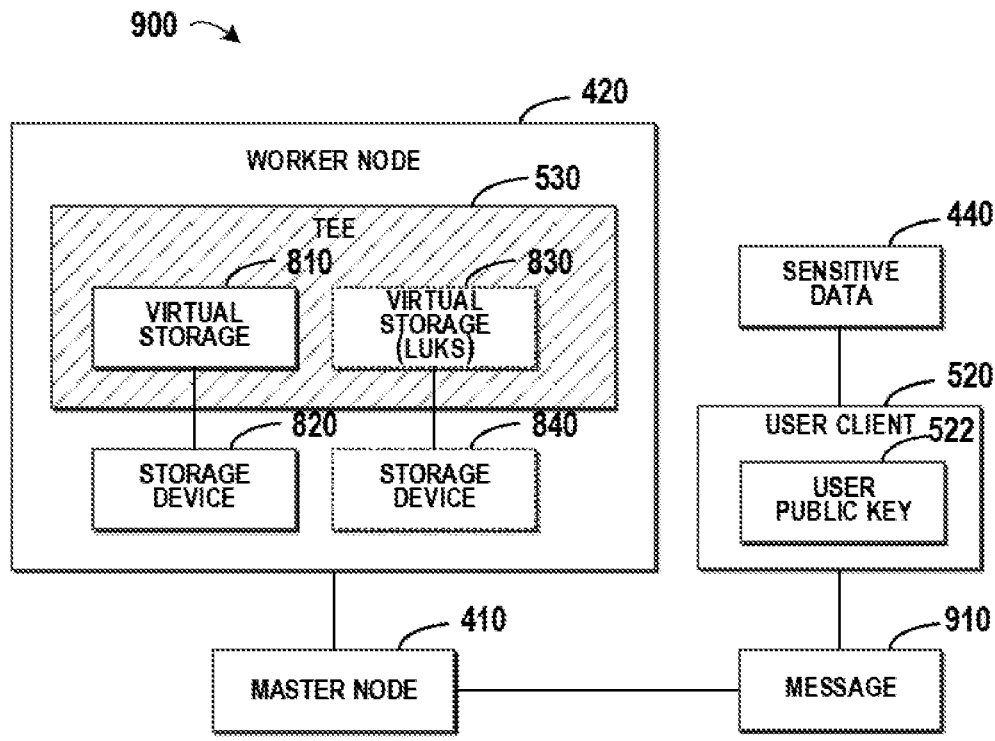
FIG. 9 depicts an example procedure for encrypting and decrypting sensitive data according to embodiments of the present invention.

The above paragraphs have described how to obtain the user private key in the TEE 530, hereinafter reference will be made to FIG. 6 for more details encrypting and decrypting the sensitive data. In FIG. 6, the user client 520 may encrypt the sensitive data 440 with the user public key 522 and then transmit 620 a message (including the encrypted sensitive data) to the worker node 420. Specifically, the message may be transmitted to the worker node 420 via the master node 410, and reference will be made to FIG. 9 for more details. FIG. 9 depicts an example procedure 900 for encrypting and decrypting sensitive data according to embodiments of the present invention. In FIG. 9, the sensitive data may be encrypted with the user public key 522 into a message 910. Further, the message 910 may be transmitted to the master node 410 via an existing link in the container management system 400. In other words, the message 910 may be transmitted in a similar manner as before, and the difference from the existing solution is that the message 910 is in an encrypted version and it is invisible without the user private key. Therefore, the message 910 is safe during the transmission, and the security level of the container management system 400 is increased.

In some embodiments, the sensitive data may include any of an environment parameter and a file. With respect to the environment parameter, the master node 410 may forward the message 910 to the storage device 820 in the worker node 420, and then the environment parameter may be loaded into the virtual storage 810 (such as a memory) that is mounted to the storage device 820. At this point, the encrypted environment parameter included in the message 910 may be decrypted with the user private key 524 in the TEE 530. Here, the decrypted version of the sensitive data is only visible in the TEE 530, and thus the TEE 530 may provide full protection to the sensitive data. Accordingly, the sensitive data may be used for installing and configuring the container in the worker node 420. In some embodiments, if the sensitive data relates to a file, the message may be loaded into the virtual storage 830 based on the LUKS. Then, the LUKS password may be used to access the encrypted file in the TEE 530. Therefore, the LUKS technique may provide further protections to the sensitive data.

With these embodiments, the pair of provider keys may facilitate in transmitting the user private key 524 from the user client 520 to the TEE 530 in the worker node 420. Further, the pair of user keys may facilitate in encrypting and decrypting the sensitive data. Therefore, the sensitive data may be transmitted in an encrypted version outside the TEE 530, and the sensitive may be stored and used in a decrypted version inside the TEE 530. Accordingly, the security level of the container management system 400 may be greatly increased.

The present invention may be a system, a method, and/or a computer program product at any possible technical detail level of integration. The computer program product may include a computer readable storage medium (or media) having computer readable program instructions thereon for causing a processor to carry out aspects of the present invention. The above paragraphs have described the communication between the worker node 420 and the user client 520. In some embodiments, the above procedures may be implemented by methods in the worker node 420 and the user client 520, respectively.

Figure 10:
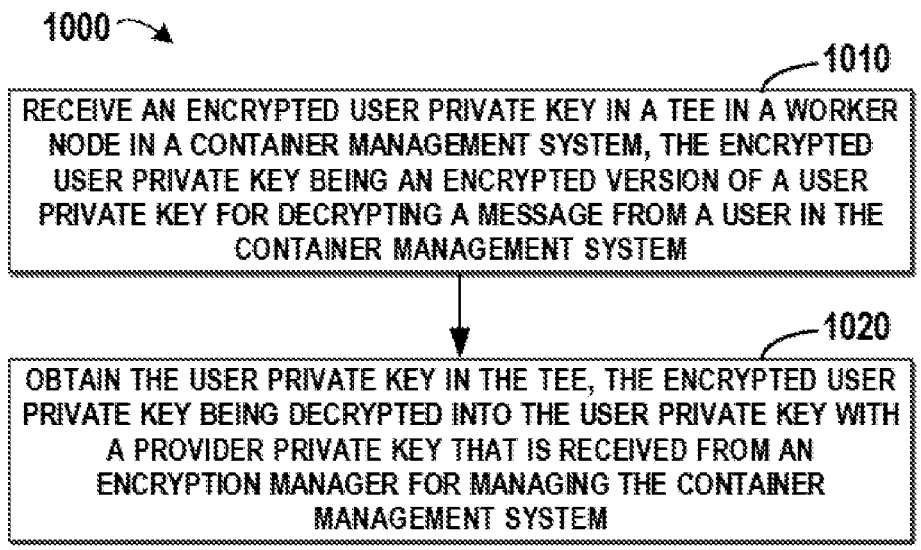
FIG. 10 depicts an example flowchart of a method for obtaining a user private key for decrypting a message from a user according to embodiments of the present invention.

Reference will be made to FIG. 10 for more details about embodiments of the present invention. FIG. 10 depicts an example flowchart of a method 1000 for obtaining a user private key for decrypting a message from a user according to embodiments of the present invention. Here, the method 1000 may be implemented at the worker node 420. In FIG. 10, at block 1010, an encrypted user private key is received in a Trusted Execution Environment (TEE) in a worker node in a container management system, the encrypted user private key being an encrypted version of a user private key for decrypting a message from a user in the container management system. The user private key is received in the TEE, here the encrypted user private key is decrypted into the user private key with a provider private key that is received from an encryption manager for managing the container management system.

In some embodiments, the user private key is received in the TEE, and the user private key is decrypted by a firmware associated with the worker node based on the provider private key stored in a hardware security module connected between the worker node and the encryption manager. In some embodiments, in order to receive the encrypted user private key, a disk image is received at a storage device that is outside the TEE in the worker node, the disk image includes the encrypted user private key from an image registry in the container management system, and the image registry stores at least one disk image that is to be deployed to the worker node. Further, the encrypted user private key is extracted in the TEE from the disk image. In some embodiments, in order to extract the encrypted user private key in the TEE, an virtual storage in the TEE is attached to the storage device, the disk image is loaded from the storage device into the virtual storage in the TEE, and then the encrypted user private key is extracted in the TEE by parsing the disk image that is loaded into the virtual storage.

In some embodiments, a message is received in the TEE from the user of the container management system, here the message including sensitive data that is encrypted with a user public key corresponding to the user private key. Then, in the TEE, the message is decrypted into the sensitive data with the user private key. In some embodiments, in order to receive the message in the TEE the message, the message is first received at a storage device in the worker node that is outside the TEE, and then an virtual storage in the TEE is attached to the storage device for loading the message from the storage device into the virtual storage in the TEE. In some embodiments, a password is received for accessing the message in the virtual storage in the TEE, and the message in the virtual storage in the TEE. In some embodiments, the container management system includes a Kubernetes system, and the user in the container management system includes any of a customer and an administrator of the Kubernetes system. In some embodiments, the sensitive data of the user includes any of an environment parameter and a file for deploying a container associated with the disk image in the work node, and the disk image is installed in the work node based on the sensitive data.

Figure 11:
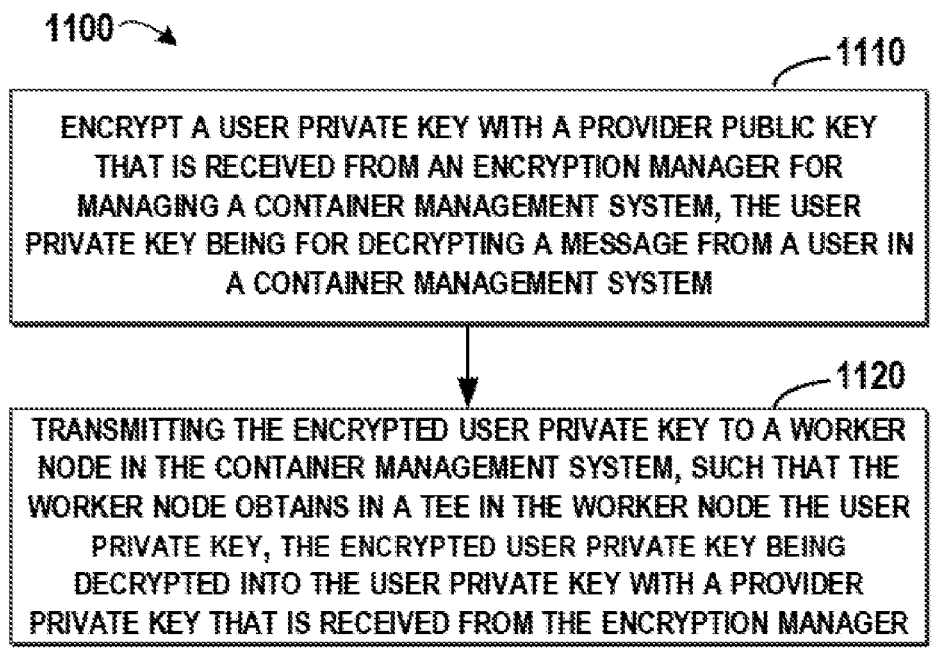
FIG. 11 depicts an example flowchart of a method for transmitting a user private key to a worker node according to embodiments of the present invention.

FIG. 11 depicts an example flowchart of a method 1100 for transmitting a user private key to a worker node according to embodiments of the present invention. The method 1100 may be implemented at the user client 520. In FIG. 11, at block 1110, a user private key is encrypted with a provider public key that is received from an encryption manager for managing a container management system, here the user private key is for decrypting a message from a user in a container management system. At block 1120, the encrypted user private key is transmitted to a worker node in the container management system, such that the worker node obtain in a TEE in the worker node the user private key, the encrypted user private key is decrypted into the user private key with a provider private key that is received from the encryption manager.

In some embodiments, in order to transmit the encrypted user private key to the TEE, the encrypted user private key is inserted into a disk image of a container that is to be deployed in the worker node, and then the disk image is transmitted to the worker node, such that the worker node extracts the encrypted user private key from the disk image. In some embodiments, sensitive data of the user is encrypted with a user public key corresponding to the user private key, and then a message including the encrypted sensitive data is transmitted to the worker node, such that the worker node decrypts in the TEE the encrypted sensitive data into the sensitive data with the user private key. In some embodiments, the message is transmitted to the worker node via a master node for managing the worker node in the container management system. In some embodiments, a password is transmitted to the worker node, such that the worker node accesses the message in the TEE. In some embodiments, the container management system includes a Kubernetes system; and the user in the container management system includes any of a customer and an administrator of the Kubernetes system. In some embodiments, the sensitive data of the user includes any of an environment and a file for deploying a container associated with the disk image in the work node.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by one or more processors, an encrypted user private key in a Trusted Execution Environment (TEE) in a worker node in a container management system, the encrypted user private key being an encrypted version of a user private key for decrypting a message from a user in the container management system, the user private key existing only in the TEE for decrypting the message from the user, wherein the receiving of the encrypted user private key includes,
receiving, by one or more processors, at a storage device that is outside the TEE in the worker node, a disk image including the encrypted user private key from an image registry in the container management system, the image registry storing at least one disk image that is to be deployed to the worker node,
extracting, by one or more processors, in the TEE the encrypted user private key from the disk image; and
obtaining, by one or more processors, the user private key in the TEE, the encrypted user private key being decrypted into the user private key with a provider private key that is received from an encryption manager for managing the container management system.

2. The method of claim 1, wherein obtaining the user private key comprises:
receiving, by one or more processors, the user private key that is decrypted by a firmware associated with the worker node based on the provider private key stored in a hardware security module connected between the worker node and the encryption manager.

3. The method of claim 1, wherein extracting in the TEE the encrypted user private key comprises:
attaching, by one or more processors, a virtual storage in the TEE to the storage device;
loading, by one or more processors, the disk image from the storage device into the virtual storage in the TEE; and
extracting, by one or more processors, in the TEE the encrypted user private key by parsing the disk image that is loaded into the virtual storage.

4. The method of claim 1, further comprising:
receiving, by one or more processors, in the TEE the message from the user of the container management system, the message including sensitive data that is encrypted with a user public key corresponding to the user private key; and
decrypting, by one or more processors, in the TEE the message into the sensitive data with the user private key.

5. The method of claim 4, wherein receiving in the TEE the message comprises:
receiving, by one or more processors, the message at the storage device that is outside the TEE in the worker node;
attaching, by one or more processors, a virtual storage in the TEE to the storage device; and
loading, by one or more processors, the message from the storage device into the virtual storage in the TEE.

6. The method of claim 5, further comprising:
receiving, by one or more processors, a password for accessing the message in the virtual storage in the TEE; and
accessing, by one or more processors, the message in the virtual storage in the TEE with the password.

7. The method of claim 1, wherein the container management system includes a Kubernetes system, and the user in the container management system includes any of a customer and an administrator of the Kubernetes system,
wherein sensitive data of the user includes any of an environment parameter and a file for deploying a container associated with the disk image in the work node, and the method further comprises:
installing, by one or more processors, the disk image in the work node based on the sensitive data.

8. A computer-implemented method, comprising:
encrypting, by one or more processors, a user private key with a provider public key that is received from an encryption manager for managing a container management system, the user private key being for decrypting a message from a user in the container management system; and
transmitting, by one or more processors, an encrypted user private key to a worker node in the container management system, such that the worker node obtains in a Trusted Execution System (TEE) in the worker node the user private key, the encrypted user private key being decrypted into the user private key with a provider private key that is received from the encryption manager, wherein the transmitting of the encrypted user private key includes:
inserting, by one or more processors, the encrypted user private key into a disk image of a container that is to be deployed in the worker node,
transmitting, by one or more processors, the disk image to the worker node, such that the worker node extracts the encrypted user private key from the disk image.

9. The method of claim 8, further comprising:
encrypting, by one or more processors, sensitive data of the user with a user public key corresponding to the user private key; and
transmitting, by one or more processors, a message including the encrypted sensitive data to the worker node.

10. The method of claim 9, wherein the worker node decrypts in the TEE the encrypted sensitive data into the sensitive data with the user private key.

11. A computer-implemented system, comprising a computer processor coupled to a computer-readable memory unit, the memory unit comprising instructions that when executed by the computer processor implements a method comprising:
receiving an encrypted user private key in a Trusted Execution Environment (TEE) in a worker node in a container management system, the encrypted user private key being an encrypted version of a user private key for decrypting a message from a user in the container management system, the user private key existing only in the TEE for decrypting the message from the user, wherein the receiving of the encrypted user private key includes,
receiving, by one or more processors, at a storage device that is outside the TEE in the worker node, a disk image including the encrypted user private key from an image registry in the container management system, the image registry storing at least one disk image that is to be deployed to the worker node,
extracting, by one or more processors, in the TEE the encrypted user private key from the disk image; and
obtaining the user private key in the TEE, the encrypted user private key being decrypted into the user private key with a provider private key that is received from an encryption manager for managing the container management system.

12. The computer-implemented system of claim 11, wherein obtaining the user private key comprises:
receiving the user private key that is decrypted by a firmware associated with the worker node based on the provider private key stored in a hardware security module connected between the worker node and the encryption manager.

13. The computer-implemented system of claim 11, wherein extracting in the TEE the encrypted user private key comprises:
attaching a virtual storage in the TEE to the storage device;
loading the disk image from the storage device into the virtual storage in the TEE; and
extracting in the TEE the encrypted user private key by parsing the disk image that is loaded into the virtual storage.

14. The computer-implemented system of claim 12, further comprises:
receiving in the TEE the message from the user of the container management system, the message including sensitive data that is encrypted with the user public key corresponding to the user private key; and
decrypting in the TEE the message into the sensitive data with the user private key.

15. The computer-implemented system of claim 14, wherein receiving in the TEE the message comprises:
receiving the message at the storage device that is outside the TEE in the worker node;
attaching a virtual storage in the TEE to the storage device; and
loading the message from the storage device into the virtual storage in the TEE.

16. The computer-implemented system of claim 15, further comprising:
receiving a password for accessing the message in the virtual storage in the TEE; and
accessing the message in the virtual storage in the TEE with the password.

17. The computer-implemented system of claim 11, wherein the container management system includes a Kubernetes system, and the user in the container management system includes any of a customer and an administrator of the Kubernetes system,
wherein sensitive data of the user includes any of an environment parameter and a file for deploying a container associated with the disk image in the work node, and the computer-implemented system further comprises:
installing, by one or more processors, the disk image in the work node based on the sensitive data.

* * * * *